(12) United States Patent
Wang et al.

(10) Patent No.: US 12,468,716 B2
(45) Date of Patent: Nov. 11, 2025

(54) CONTENT-BASED OPERATION SELECTION

(71) Applicant: Oracle International Corporation, Redwood Shores, CA (US)

(72) Inventors: Winston Leonard Wang, San Francisco, CA (US); Daniel Benjamin Workman, Acton, MA (US); Adriana Peña, Zapopan (MX); Jun Ho Kim, Sammamish, WA (US); David McColgin, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/779,679

(22) Filed: Jul. 22, 2024

(65) Prior Publication Data

US 2025/0252110 A1 Aug. 7, 2025

Related U.S. Application Data

(60) Provisional application No. 63/550,171, filed on Feb. 6, 2024.

(51) Int. Cl.
*G06F 16/2457* (2019.01)
*G06F 16/242* (2019.01)
*G06F 16/26* (2019.01)

(52) U.S. Cl.
CPC ...... *G06F 16/24578* (2019.01); *G06F 16/243* (2019.01); *G06F 16/26* (2019.01)

(58) Field of Classification Search
CPC ... G06F 16/24578; G06F 16/243; G06F 16/26
See application file for complete search history.

(56) References Cited

U.S. PATENT DOCUMENTS

| | | | |
|---|---|---|---|
| 11,756,548 B1* | 9/2023 | Perkins | G06F 40/30 |
| | | | 704/257 |
| 12,058,160 B1* | 8/2024 | Erlingsson | G06F 16/906 |
| 2020/0196020 A1* | 6/2020 | Mohamed | H04L 67/54 |

OTHER PUBLICATIONS

Narechania et al., "NL4DV: A toolkit for generating analytic specifications for data visualization from natural language queries." IEEE Transactions on Visualization and Computer Graphics 27.2 (2020): 369-379. (Year: 2020).*

* cited by examiner

*Primary Examiner* — Jay A Morrison
(74) *Attorney, Agent, or Firm* — Invoke

(57) ABSTRACT

Techniques for initiating commands in a user interface by disambiguating user input terms are disclosed. As a system displays a set of data, the system receives a user input that includes a set of terms. The system determines the terms correspond to multiple different interpretations. The system selects a particular interpretation for the terms based on context data. The context data includes data, such as user profile data and display data. The user profile data includes data for a user entering the terms and data of other users related to the user entering the terms. The system selects and executes a command based on selecting the particular interpretation for the terms.

20 Claims, 8 Drawing Sheets

CONTENT-BASED OPERATION SELECTION

INCORPORATION BY REFERENCE; DISCLAIMER

Each of the following applications are hereby incorporated by reference: Application No. 63/550,171 filed on Feb. 6, 2024. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to context-based operation selections. In particular, the present disclosure relates to selecting an interpretation for a set of ambiguous terms using context data associated with a user or displayed data. The system selects an operation, from among multiple possible operations, based on the selected interpretations.

BACKGROUND

Graphical user interfaces (GUIs) provide a mechanism for a user to execute operations in an application by interacting with visual elements displayed on a display device. Some platforms provide users with a GUI to interact with multiple different applications. The GUI may include a data entry field that receives a user's text input. The system then performs operations associated with the applications based on the user's text input. However, if a user's text input could correspond to multiple different functions across one or more applications, the platform may be unable to initiate the desired operations. In some cases, a system may initiate the incorrect application, resulting in wasted time, resources, and in some cases, undesired modifications to data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
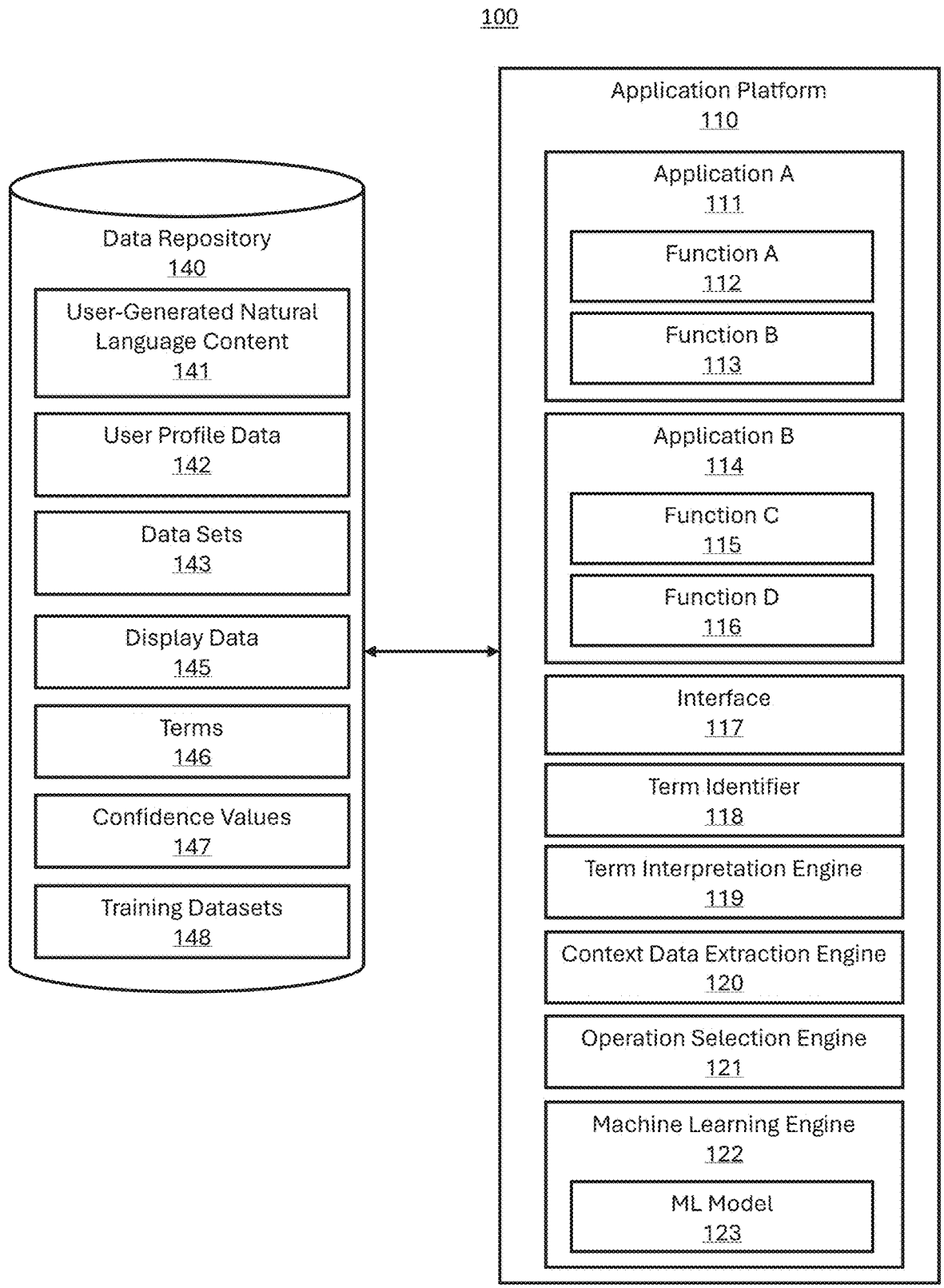
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CONTEXT-BASED OPERATION SELECTION ARCHITECTURE
3. CONTEXT-BASED OPERATION SELECTION
4. TRAINING A MACHINE LEARNING MODEL
5. EXAMPLE EMBODIMENTS
6. COMPUTER NETWORKS AND CLOUD NETWORKS
7. HARDWARE OVERVIEW
8. MISCELLANEOUS; EXTENSIONS

1. General Overview

One or more embodiments identify and analyze context data, such as displayed data, to disambiguate a user input. A system receives a user input to a text entry field of a graphical user interface (GUI). The system determines that the terms entered by the user correspond to two or more interpretations. For example, a term entered by the user may have multiple different interpretations that may correspond, respectively, to multiple different operations, data objects, applications, or variables. The system accesses context data to resolve the ambiguity in the user-generated terms and select a particular interpretation for the term from among the different interpretations. The system obtains the context data from one or more of (a) the user's profile, (b) the profiles of other users, and (c) the displayed content at the time the user entered a set of terms in the text entry field. The context data may include, for example, access or authorization data. Access data may include data indicating the data and objects a user has access to. The context data may also include, for example, historical query data for the user. For example, the system may analyze user profile data for a user entering a set of terms to identify the data the user is authorized to access and the operations the user is authorized to initiate. Similarly, the system may analyze the user profile data to retrieve historical query data for the user. According to another example, the system may analyze the user profile data to identify the user's role, such as the user's position within a company. The system may access historical query data for other users with the same role to generate the context data for the terms entered by the user. Based on the context data, the system selects one interpretation from among the multiple possible interpretations for the set of terms as a target interpretation. The system selects an operation for execution based on the target interpretation. The system may refrain from using non-selected interpretations, i.e., interpretations that do not meet one or more relationship criteria in relation to the context data. By refraining from using the non-selected interpretations, the system improves performance by excluding improper or irrelevant operations and/or results.

One or more embodiments analyze displayed content on a display device to obtain context data for user-entered terms in a text entry field of a GUI in the display device. The system selects an interpretation from among the possible interpretations for the set of terms based on the context data corresponding to the displayed content. According to one example, an application obtaining context data is different from an application displaying data. According to this example, the application obtaining context data may interact with an application programming interface (API) of the application displaying data to obtain information about displayed content. For example, the system may interact with the API to identify a root component of a JFrame and child components of the JFrame. Obtaining information about child components may include iteratively executing operations to identify "AccessibleContext." In an alternative embodiment, the application obtaining context data is the same as the application displaying content in the GUI of the display device. In this example, the application may access log data for executing operations to obtain context data. An example of context data is information about a source of displayed content, such as a data object in a database from which the displayed content was retrieved. For example, a GUI may display data for a set of employees. The system may access context data specifying an "Employee" data object from which the data for the set of employees was obtained. The system uses the context data to interpret user-entered text. For example, the system may interpret an ambiguous term entered by the user to mean an employee attribute in the "Employee" data object rather than a product attribute in a "Product" data object based on determining the displayed content corresponds to the "Employee" data object.

One or more embodiments apply a machine learning model to a set of data, including user-entered terms and context data, to select an operation corresponding to user-entered terms. The machine learning model may generate a confidence score associated with a set of candidate term interpretations. Based on the confidence scores generated by the machine learning model, the system may select a particular interpretation as a target term interpretation. For example, a set of user-entered terms may correspond to an operation to open an application and an operation to retrieve a set of records from a database. The system provides the user-entered terms and context data, including information about content being displayed in a GUI when the user entered the terms, to the machine learning model. The machine learning model may predict with 80% confidence that the user-entered terms correspond to an interpretation associated with the operation to retrieve records from a database. The system resolves the ambiguity in the user-entered terms to select the record-retrieval type operation. The system structures instructions for executing the record-retrieval operation using the user-entered terms.

One or more embodiments create and edit visualizations in a GUI based on a user entering natural language terms in a text entry field or other user interface element. For example, a user may view a set of visualizations representing a stored set of data objects. The user may enter a set of terms to "add Opportunity object" into a text entry field. The system identifies from context data that the GUI is displaying a set of data objects. The system determines that "Opportunity" is another type of data object that is not presently being displayed. The system determines the target interpretation for the entered text includes generating a new visualization, concurrently with the presently displayed data objects, for the additional data object "Opportunity." The system determines from the display data the level of detail associated with the presently displayed data objects. For example, the system may determine that the data objects are displayed as particular icons, including an object name, and a "last modified" data field. The icons include interface elements to allow a user to select the interface icons to present additional details about the data objects. Based on the input terms and the context data, the system generates a new visualization for the data object "Opportunity" that is patterned after concurrently displayed visualizations for other data objects.

One or more embodiments obtain context data for a user entering text in a text entry field to determine permissions associated with the user. The context data may include metadata associated with permissions specified in the user's profile or stored in a data object representing the user. Based on the context data, including the permissions data, the system selects one or more operations to perform in response to the user-entered text.

One or more embodiments generate computer-generated follow-up questions to resolve ambiguities in user-entered text. For example, the system may determine that a user-entered term corresponds to three different candidate interpretations. The system may determine that the confidence levels associated with the interpretations do not meet a threshold level. According to one example, the system applies the candidate interpretations to a machine learning model to generate the confidence values for the interpretations. The machine learning model predicts confidence values for the interpretations. Based on determining that the confidence values do not meet a threshold (such as a threshold of 0.5 from a range of values between 0 and 1), the system generates a follow-up question to increase the confidence value. For example, the system may generate questions directed to the two interpretations having the highest confidence values to determine if the user's intent was to refer to one of the two interpretations having the highest confidence values. The system may generate questions based on retrieved context data. For example, the system may determine that two interpretations correspond to two different functions available in a present view of a GUI. The system may present the two functions to the user as options, such as "Do you want to generate a new invoice for ABC Co., or do you want to view an existing invoice for ABC Co?" The system may select a target interpretation and corresponding operations based on the user responses to the system-generated questions.

One or more embodiments described in this Specification and/or recited in the claims may not be included in this General Overview section.

2. Context-Based Operation Selection Architecture

FIG. 1 illustrates a system 100 in accordance with one or more embodiments. As illustrated in FIG. 1, system 100 includes an application platform 110 and a data repository 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Components may be distributed over multiple applications and/or machines. Multiple components may be combined into one application and/or machine. Operations described with respect to one component may instead be performed by another component.

In one or more embodiments, a data repository 140 is any type of storage unit and/or device (e.g., a file system, database, collection of tables, or any other storage mechanism) for storing data. Further, a data repository 140 may include multiple different storage units and/or devices. The multiple different storage units and/or devices may or may not be of the same type or located at the same physical site. Further, a data repository 140 may be implemented or executed on the same computing system as the application platform 110. Additionally, or alternatively, a data repository 140 may be implemented or executed on a computing system separate from the application platform 110. The data repository 140 may be communicatively coupled to the application platform 110 via a direct connection or via a network.

Information describing user-generated natural language content 141, user profile data 142, data sets 143, display data 145, terms 146, confidence values 147, and training datasets 148 may be implemented across any of components within the system 100. However, this information is illustrated within the data repository 140 for purposes of clarity and explanation.

In one or more embodiments, the application platform 110 refers to hardware and/or software configured to perform operations described herein for executing applications, presenting a graphical user interface (GUI) to present data sets and receive user input, determining term interpretations based on context data, and executing operations based on the term interpretations. Examples of operations for performing operations based on context data are described below with reference to FIG. 2.

In an embodiment, the application platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

The application platform 110 manages applications (Application A 111 and Application B 114). Application 111 is configured to execute functions (Function A 112 and Function B 113). Application 114 is configured to execute functions (Function C 115 and Function D 116). For example, the application platform 110 may include software executing on a computer that presents a graphical user interface (GUI) via the interface 117. The GUI may display interface elements to execute functions A-D 112, 113, 115, and 116. The GUI may include menu icons to select applications A and B 111 and 114. Selecting an application may open an application-based interface in the GUI. Applications 111 and 114 may execute on a same computer, such as a server, as the application platform 110. Alternatively, applications 111 and 114 may execute on servers in communication with a server on which the application platform 110 executes. According to one example, application platform 110 may run on a virtual machine executing on one server. The application platform 110 may open and execute applications 111 and 114 on the virtual machine based on user selections in the GUI.

Applications 111 and 114 may include data management applications. The data management applications may present interfaces to retrieve, view, and modify data sets 143. For example, an enterprise may maintain a database of employee data, product data, and customer data. The enterprise may maintain one application to view and modify employee data, another application to view and modify product data, and a third application to view and modify customer data. Viewing and modifying data may include querying the database to retrieve database records. Viewing and modifying data may include retrieving data objects that specify particular data types that may be displayed for a particular user and other data types that are not displayed for the particular user. Viewing and modifying data may include rendering digitally stored data in a visual format, such in a document format, an interactive user interface, a graphical format, or any other visual format. While applications for viewing and modifying data stored in a database are provided as one example, embodiments encompass any type of application, including device-control applications (such as applications that manage networked devices, such as printers, scanners, cameras, etc.), network communications applications, system monitoring and management applications, image editing applications, text editing applications, audio/visual editing applications, etc.

In one or more embodiments, interface 117 refers to hardware and/or software configured to facilitate communications between a user and the application platform 110. Interface 117 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 117 is specified in one or more other languages, such as Java, C, or C++.

The graphical user interface presented by the interface 117 displays a text entry field. A user enters terms 146 into the text entry field to cause the application platform 110 to perform one or more functions 112, 113, 115, and/or 116 of one or more applications 111 and/or 114. A term identifier 118 identifies terms 146 entered in the text entry field. The term identifier 118 may include, for example, a parser to parse the different types of terms 146 in the data entry field. For example, the term identifier may distinguish between names, functions, types, and punctuation in the data entry field.

In one embodiment, the term identifier 118 includes a tokenizer to divide text into tokens. A token is a set of one or more characters that are grouped together. For example, a token may be a word separated from adjacent tokens by spaces. In addition, a number (e.g., "30") is a separate token. The tokenizer determines if a character is a part of a token associated with an adjacent, previously analyzed character, or if the character is part of a separate token. The tokenizer may consider attributes of the characters to determine if two adjacent characters belong to the same token. For example, the tokenizer may analyze the following: a font of the characters, spacing between characters, spacing associated with the font, a formatting style of the characters, a language of the characters, and a character type (e.g., alphanumeric or punctuation) of the characters. The term identifier 118 may store separate tokens as separate terms 146.

An operation selection engine 121 selects an operation to perform (e.g., functions 112, 113, 115, and/or 116) based on a set of terms identified by the term identifier 118. For example, a user may input the terms "create a new invoice" or "new invoice" into the text entry field. The term identifier 118 identifies the terms, including a function "create" and an object "new invoice." In some instances, a term may be associated with two or more interpretations or meanings. In these instances, the term interpretation engine 119 predicts which interpretation, from among the multiple interpretations, is correct.

The term interpretation engine 119 predicts which interpretation is correct based on context data. A context data extraction engine 120 obtains context data, including user profile data 142 and/or display data 145. In an embodiment in which the context data extraction engine 120 obtains user profile data 142, the context data extraction engine 120 determines an identity of a user entering text into the text entry field. For example, a user may be logged into the application platform 110. The context data extraction engine 120 may determine the identity of the user based on login information. The application platform 110 may store metadata associated with the user logged in to the platform 110. In addition, the context data extraction engine 120 may access additional user profile data 142 stored in a database. User profile data may include a user's role in an organization maintaining or accessing the application platform 110. For example, an enterprise may subscribe to a cloud-based application platform service. The application platform 110 may store the user's role (e.g., manager, developer, sales representative, etc.) in the enterprise. The user profile data 142 may include additional data, such as a user's location, a user's department in an enterprise, demographic information, and authority level (e.g., a level of authorization to access different data objects and/or data views of a database).

According to one example, the context data extraction engine 120 interacts with an application programming interface (API) of the application 111 displaying data in the GUI of the interface 117 to obtain information about displayed content. For example, the context data extraction engine 120 may interact with the API to identify a root component of a JFrame and child components of the JFrame. Obtaining information about child components may include iteratively executing operations to identify "AccessibleContext." According to another example, the context data extraction engine 120 accesses log data in the application 111 to determine which content is presently being displayed and/or which operations are presently executing in connection with displayed data.

Additionally, or alternatively, the context data extraction engine 120 obtains display data 145 of data being displayed or visualized in a GUI concurrently with the user entering terms in the text entry field. For example, the GUI may be presenting a set of files, a document directed to a particular topic, a set of nodes representing data objects stored in a database, such as a set of employees, a set of products, or a set of customers. The GUI may visualize a set of search results from a search of a database, a local set of documents, or a set of websites, such as websites corresponding to uniform resource locator (URL) addresses on the Internet.

In some example embodiments, the context data extraction engine 120 obtains only one type of context data, such as only user profile data 142 or only display data 145. In other example embodiments, the context data extraction engine 120 obtains both user profile data 142 and display data 145. In some embodiments, the context data extraction engine 120 applies a set of rules to determine whether or not to obtain one or both of user profile data 142 and display data 145. The rules may specify, for example, that the context data extraction engine 120 extracts user profile data 142 in one set of circumstances and display data 145 in another set of circumstances.

In one or more embodiments, the user profile data 142 includes data associated with other users other than the user entering the text in the text entry field. For example, the context data extraction engine 120 may identify the user entering text in the text entry field as a software development team leader. The context data extraction engine 120 may extract identifiers associated with other software development team leaders. The context data extraction engine 120 may further extract metadata for the other software development team leaders that identifies operations or functions initiated by the other software development team leaders.

According to an embodiment, the term interpretation engine 119 predicts interpretations for terms based on confidence values 147 associated with the candidate term interpretations. The confidence values may correspond to probability values. For example, the term interpretation engine 119 may determine, based on user profile data 142, that 8 times out of 10, the term "show" in the set of terms "show Jane Doe profile" refers to "display data for the requesting user" rather than "present data to Jane Doe." Accordingly, the term interpretation engine 119 may predict a probability value of 0.8 for the corresponding interpretation of the word "show" based on the user profile data. As another example, the system may determine that when a set of display data 145 indicates two managers, including Jane Doe, are sharing a display in a virtual meeting, the term "show Jane Doe sales" means "present the displayed sales data to the manager Jane Doe" six out of ten times. Accordingly, the term interpretation engine 119 may predict a probability value of 0.6 for the corresponding interpretation of the word "show" based on the display data 145.

In an embodiment, the term interpretation engine 119 applies a machine learning model 123 to predict one or both of (a) term interpretations and (b) confidence values associated with the term interpretations. A machine learning engine 122 trains the machine learning model 123 to predict term interpretations and/or confidence values.

In one or more embodiments, the machine learning engine 122 trains the machine learning model 123 based on iterating a machine learning algorithm to train a target model f that best maps a set of input variables to an output variable, using a set of training data. The training data includes training datasets 148 and associated labels. The datasets are associated with input variables for the target model f. The associated labels are associated with the output variable of the target model f. The training data may be updated based on, for example, feedback on the predictions by the target model f and accuracy of the current target model f. Updated training data is fed back into the machine learning algorithm, which in turn updates the target model f.

The training datasets 148 include (a) terms and (b) interpretations associated with the terms. The training datasets 148 may further include commands initiated based on the terms, user profile data associated with the terms, display data associated with the terms, and predefined confidence values associated with the interpretations. In one embodiment, the machine learning model 123 is a fine-tuned machine learning model. The fine-tuned model includes a base portion trained to predict a set of candidate interpretations for a term. The fine-tuned model includes a classification head configured to receive the output from the base portion and to generate confidence values for the set of candidate interpretations. In an alternative embodiment, the machine learning model 123 is configured to receive as input data a term or set of terms and a corresponding candidate interpretation for the term. The machine learning model 123 predicts a confidence value for the term/candidate interpretation pair.

A machine learning algorithm may include supervised components and/or unsupervised components. Several types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

The operation selection engine 121 selects an operation for execution based on the term interpretation determined by the term interpretation engine 119. For example, the term interpretation engine 119 may select a set of interpretations for a set of terms based on determining the set of terms corresponds to candidate interpretations having the highest confidence values 147. Examples of operations include the following: presenting and modifying data sets; generating, displaying, and modifying visual elements; running analytics operations; creating and modifying data files or data objects; and creating and modifying text content in a document, file, visual element, or object.

In some embodiments, the term interpretation engine 119 determines confidence values 147 for combinations of multiple terms. For example, a first term in a set of terms may be associated with a confidence value of 0.5. This may represent the highest confidence value for the term among a set of candidate interpretations. However, a combination of interpretations for a set of two or more terms may correspond to a confidence value of 0.8. The two or more terms may correspond to a different interpretation for the first term that may have a confidence value less than 0.5. In this example, when the candidate terms are considered in combination, the confidence value for the combination exceeds the confidence values for alternative interpretations. According to one embodiment, the machine learning model 123 is an encoder-type model that receives as input data multiple terms in a set of terms to predict confidence values for interpretations for terms based on (a) other terms in the set of terms and (b) an order in which the terms appear in the set of terms.

Additional embodiments and/or examples relating to computer networks are described below in Section 6, titled "Computer Networks and Cloud Networks."

3. Context-Based Operation Selection

Figure 2:
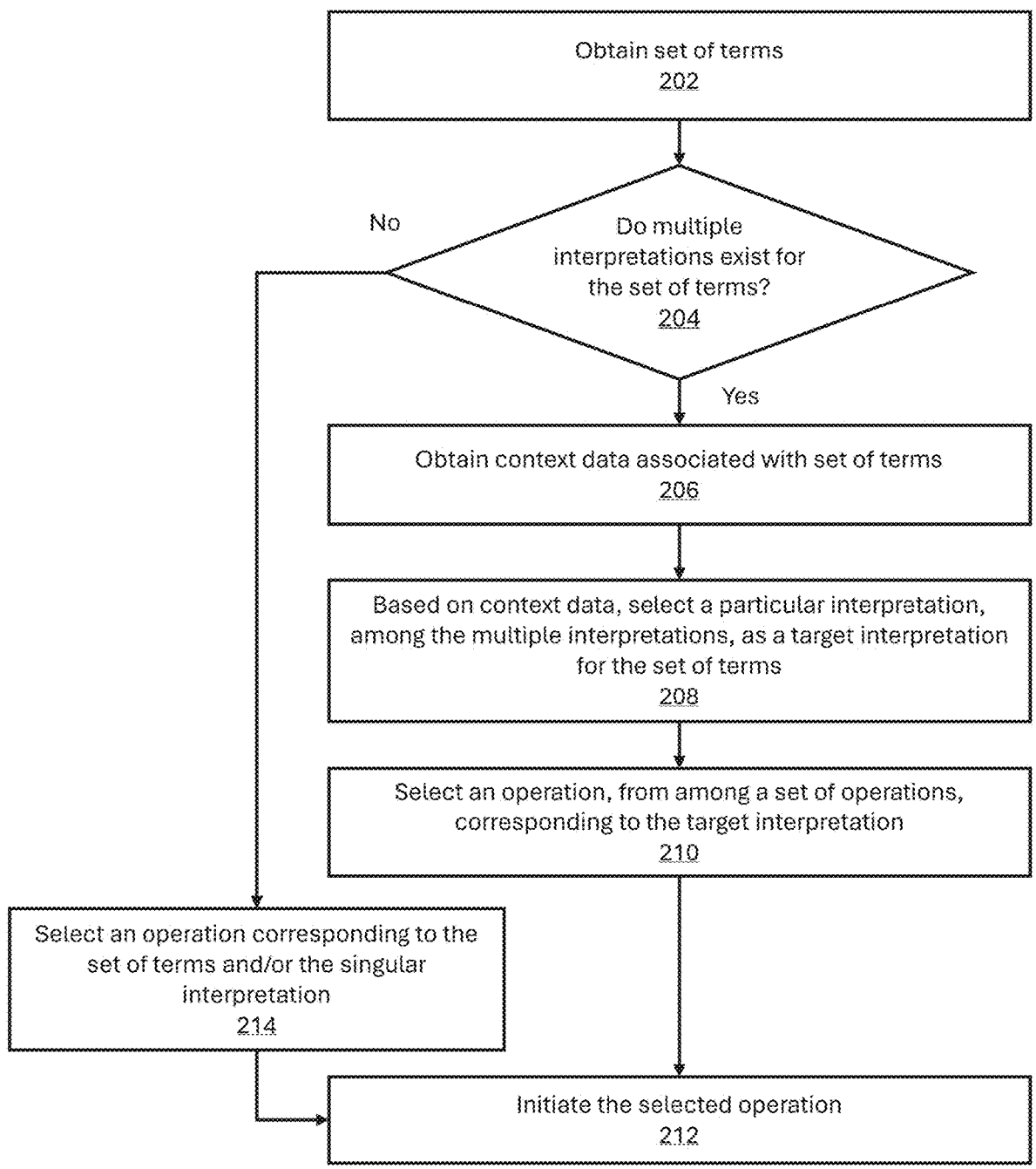
FIG. 2 illustrates an example set of operations for context-based operation selection in accordance with one or more embodiments.

FIG. 2 illustrates an example set of operations for selecting an operation to perform by determining an interpretation of a set of terms with multiple meanings in accordance with one or more embodiments. One or more operations illustrated in FIG. 2 may be modified, rearranged, or omitted. Accordingly, the sequence of operations illustrated in FIG. 2 should not be construed as limiting the scope of one or more embodiments.

According to an embodiment, a system obtains a set of terms (Operation 202). For example, the system may obtain a natural language input generated by a user entering a set of words and/or symbols in a text entry field of a graphical user interface (GUI). According to another example, a user may select an interface element by moving a cursor displayed in the GUI over the user interface element. Selection of the interface element may direct an application executed by the system to access a set of words and/or symbols associated with the interface element. The user interface element may display words and/or symbols representing an operation.

In one or more embodiments, the text entry field is associated with a software platform that has the functionality of initiating and executing multiple different operations of several types in multiple different applications. For example, one application may be a database search application. Another application may be a form generation/completion application. Another application may be an email-generation application. Another application may be a project management application. The platform may include functionality to initiate operations in any of the applications based on user-generated natural language text in the text entry field.

Based on the received user input, the system identifies a set of terms. The set of terms may include words, symbols, and phrases included in a natural language input. The set of terms may further include words inferred based on the user input. For example, a user may input the terms "May Lowe Invoice" into a text entry field. The system identifies the words "May," "Lowe," and "invoice" as terms. As another example, a user may input the roots "generat invoic" into a text entry field. Based on the roots entered in the text entry field, the system may infer the following terms: generate, generator, generates, generated, generating, invoice, invoices. As another example, a user may misspell a word in a text entry field, such as "ensure packages," where the user intended to enter "insure packages." The system may identify the following terms based on the user-entered terms: ensure, ensured, ensures, insure, insures, insured, and/or insurance. The terms may include a combination of user-entered terms and inferred terms.

The system determines if multiple interpretations exist for the set of terms (Operation 204). The multiple interpretations may correspond to multiple meanings associated with a same term or set of terms in a system. For example, the term "May" could correspond to a month, a proper name of an individual or entity, or a modal verb. As additional examples, the words "show," "present," "open," "share," "find," and "record" include multiple different meanings. In addition, combinations of two or more words may be associated with multiple different interpretations.

In addition to the terms themselves being associated with different meanings, the same terms may also be associated with two or more different operations known to, and/or executable by, the system. Accordingly, the different operations may cause the terms to have different interpretations. For example, the system may identify the following possible meanings for the terms "May Lowe Invoice": search an invoice repository to identify an invoice associated with May Lowe; search an invoice repository to identify an invoice associated with an entity "Lowe" in the month of May; generate a new invoice to an entity "May Lowe;" and generate a new invoice to an entity "Lowe" dated in May. The operations to search an invoice repository may be performed by a database query application. The operations to generate a new invoice may be performed by an invoice management application separate from the database query application. Accordingly, the system may determine the term "invoice" entered by the user corresponds to two interpretations associated with two different operations, "generate a new invoice" or "search existing invoices."

If the system determines that the set of terms corresponds to a singular interpretation, the system selects an operation corresponding to the set of terms and the singular interpretation (Operation 214). The system may select the operation without obtaining context data. For example, the system may determine that a set of terms "open data file 123.pdf" corresponds to only one interpretation, that is initiating an application to open a data file and presenting the data file to the user.

If the system determines that the set of terms corresponds to multiple different interpretations, the system obtains context data associated with the set of terms (Operation 206). According to one embodiment, the system obtains the context data by analyzing a user's profile data. For example, a system may identify the following interpretations for a set of terms "May Lowe": (1) a name of an individual (i.e., "May Lowe"), or (2) a name of a month (May), or the name of a business (Lowe). The system may identify in the user profile the name "May Lowe" associated with a client, a customer, or a contact. For example, May Lowe may be a team member of the user entering the terms. Alternatively, the system may identify in the user profile the name "Lowe" associated with a business, such as a client, a customer, or a contact.

As another example, the system may identify from the user's profile data the user's position within a company. A position "software engineer" may be associated with one set of terms, including "develop and test software code," "PYTHON," "JAVASCRIPT," and "DATABASE." A position "team manager" may be associated with a different set of terms, including "workload management," "productivity, and "oversee code development." A position "HR Associate" may be associated with yet another set of terms. Accordingly, the user's position within an organization may provide context data regarding the meaning of a term entered by the user in the text entry field.

According to another embodiment, the system analyzes user profile data of other users, other than the user that entered the terms in the term entry field, to resolve the meaning of an ambiguous term. The system may select the additional users based on relationships between the additional users and the user that entered the terms in the text entry field. For example, the system may identify a position of the user within an organization. The system may identify key words associated with other users with the same or similar positions within the organization. Additionally, or alternatively, the system may identify key words associated with other users that are related with the user's position such as subordinates in the organization hierarchy. The system may identify one or more context terms in the user profiles of the additional users. The system may generate, based on the context terms, confidence values for respective sets of different term/meaning pairs.

In one or more embodiments, the system generates a weight value, probability value, or confidence value for a particular interpretation based on context data attributes. For example, the system may identify two different elements of context data that correspond to two different interpretations for a term. One context data element may correspond to a first interpretation of the term. Another context data element may correspond to a second interpretation of the term. The system identifies attributes of the context data elements to generate a weight value for the respective context data elements. Examples of context data attributes include, for example, a degree of a relationship between a user and one or more additional users, a prominence of the context data in a user's profile, a prominence of context data in a visual display, and a semantic relationship between the context data and a set of text entered by a user. For example, a user may enter a set of terms "Project A Status report" in a text entry field. The system may identify two interpretations for the term "Project A". One interpretation may correspond to one project, and another interpretation may correspond to another project. Based on profile data of the user, the system may identify two employees associated with the respective projects. One employee may report directly to the user. The other employee may report to another manager in the same department. The system may assign a higher weight to the context data associated with the employee directly reporting to the user than to the context data associated with an employee reporting to a different manager. Based on the weights assigned to different context data, the system generates confidence values for different interpretations. For example, based on the higher weight value associated with the corresponding context data, the system generates a higher confidence score to the interpretation associated with the employee who reports direct to the user than to the employee who reports to another manager. Based on the confidence values, the system may identify an interpretation for "Project A" to mean a particular project associated with the employee who reports directly to the user.

According to yet another embodiment, the system analyzes a set of displayed data to obtain the context data. The system may determine what content is being displayed by interfacing with a GUI application programming interface (API) to determine displayed content. For example, the system may interact with the GUI API to identify a root component of a JFrame and child components of the JFrame. Obtaining information about child components may include iteratively executing operations to identify "AccessibleContext." Additionally, or alternatively, the system may perform a pixel analysis to identify text, patterns, and shapes displayed on a display device. Additionally, or alternatively, the system may access an API of an application that is currently executing to determine content that is presently being displayed. For example, based on a system request, a personnel management application may transmit to the system context data including a set of names of personnel being displayed and a name of a data object in a database where records corresponding to the set of names is stored.

Using the context data and the candidate term interpretations, the system selects a particular interpretation, from among the multiple different candidate interpretations, as a target interpretation for the set of terms (Operation 208). Continuing the above example in which a user enters a set of terms "May Lowe invoice" in a text entry field of a GUI, the system identifies multiple different interpretations associated with the entered terms. The system analyzes the user's profile data to obtain context data. From the user's profile data, the system identifies a colleague of the user named "May Lowe." Accordingly, the system determines that the target interpretation for the terms "May Lowe" is that the terms refer to a proper name of a person and not to a name of a month or a name of a company. According to another example, the system resolves the meaning of an ambiguous term based on displayed content. For example, a user may enter a set of terms including "list of products." The term "products" could potentially be interpreted to refer to any product generated by an organization or even by other organizations. The system determines that the GUI is displaying graphical elements representing records of a particular data object. The data object includes the following attributes: division, region, contact, product. The system selects a target interpretation for the term "products" in the set of terms "list of products" that corresponds to the values for the "product" attribute in the displayed data object.

According to yet another example, the system interprets the set of terms "show employee salary." For example, the term "employee" could be interpreted to mean employees within a company, employees of a particular position across multiple companies, all employees at all companies, or a single employee. The system identifies a set of employees displayed in a GUI. For example, a user may navigate through a set of views to display a set of employees within a particular department. Alternatively, the user may select a display of a set of employees that are managers within a company. The set of employees in a department may correspond to a set of attributes of a "department" object. The set of employees that are managers may correspond to a "leadership" data object. The system identifies the set of displayed employees that may correspond, for example, to the "department" or "leadership" data objects, as defining the bounds of the term "employee" in the set of terms "show employee salary." The system interprets the term "employees" to mean the set of employees being presently displayed on a display device.

According to an example embodiment, based on the context data, the system generates confidence values for each of the different possible interpretations. For example, a user profile may specify a user's position within an organization. Based on the user's position within the organization, the system may determine that there is an 85% confidence level the correct interpretation of the terms "May Lowe Invoice" (e.g., the interpretation that correctly captures the user's intent) is that "May" corresponds to a month, "Lowe" corresponds to the name of an entity, and "invoice" corresponds to a stored record. The system may determine that there is a 15% confidence level the correct interpretation is that "May Lowe" is the name of an entity and "invoice" is an instruction to open an invoice-generation application to generate a new invoice for the entity, May Lowe.

In one or more embodiments, the system generates confidence values for operations among the subset of operations by applying a machine learning model to a set of data, including the user-entered terms and the context data. According to one embodiment, the system trains a machine learning model to receive as input data a set of one or more terms and a set of one or more interpretations for the one or more terms. The machine learning model predicts a confidence value associated with the one or more interpretations. According to another example, the system trains a machine learning model to classify a set of terms as an operation type. The output of the machine learning model may be a set of softmax values, ranging from 0 to 1, for a set of operation types. The system may select, as the subset of operations corresponding to a set of user-entered terms, the machine learning outputs that correspond to softmax values exceeding a threshold. For example, the system may select the operation type having the highest softmax value as an operation corresponding to the user-entered terms. In addition, the system may select up to one additional output as a candidate operation type provided the softmax value for the output exceeds 0.33 on a scale from 0 to 1.

The system may refrain from using non-selected interpretations, i.e., interpretations that do not meet one or more relationship criteria in relation to the context data. For example, the system may select an interpretation as a target interpretation based on determining the interpretation is most closely related to a set of retrieved context data, such as profile data. As one example, a first candidate interpretation may correspond to a first employee on a user's team. A second candidate interpretation may correspond to a second employee on another team. The system may select a first interpretation as the target interpretation based on determining the direct relationship between the user and the first employee (e.g., on the same team) is greater than the indirect relationship between the user and the second employee on a different team. The system may refrain from using the non-selected interpretation as a target interpretation for a set of terms.

Examples of relationship criteria may include the following: a frequency with which a user uses a particular interpretation (such as selecting a file or interface element corresponding to the particular interpretation), how recently the user used the particular interpretation, the frequency and/or recency with which other users in the same organizational role used the particular interpretation, a degree of separation in an organizational hierarchy between a user and an employee, file, or entity corresponding to the particular interpretation, and whether the user is authorized to access a data element corresponding to the particular interpretation. In the above examples, using an interpretation may include, for example, selecting files and interface elements associated with particular interpretations. By refraining from using the non-selected interpretations, the system improves performance by excluding improper or irrelevant operations and/or results.

Based on the selected interpretation for the set of terms, the system selects an operation, from among a set of possible operations, that corresponds to the selected interpretation for the set of terms (Operation 210). For example, different interpretations associated with identified terms may correspond to two different operations. The system may interpret the set of terms based on the context data to select one operation from among the two or more operations. Operation types include, for example, the following: initiating a query of a database, searching for text content in a webpage or table, opening an application, performing a function in an application (e.g., generating a document, modifying a document, modifying a user interface element, executing software), and performing calculations.

While an example is described in above in Operations 204-210 in which a system disambiguates one or more terms to select a particular operation, according to one or more embodiments, the system disambiguates a term by applying context data to filter down a set of operations corresponding to the term. For example, a user may enter the following example terms: "inventory summary warehouse A June." The system may identify a set of operations associated with the terms including generate a summary of the inventory in warehouse A or retrieve an existing summary for warehouse A. Based on user profile data, the system may determine that the user has access to an operation to retrieve inventory summaries. The system may further determine that the user does not have access to the operation to generate a new inventory summary. Accordingly, the system may identify the operation "retrieve an existing invoice" as the operation that corresponds to the terms "inventory summary . . . " Another example using the same terms may include determining that (a) June is the name of a warehouse manager, and (b) the system is presenting in a GUI a list of warehouses and warehouse managers. The system may accordingly identify an operation to send a request to the warehouse manager, June, as the operation that corresponds to the terms "inventory summary warehouse A June."

According to one example, the system uses the user profile data to filter a set of possible operations corresponding to possible interpretations of user-entered terms down to a subset of operations. The operations may be of the same type or of different types. For example, a user may enter a set of terms "May Lowe invoice" in a text entry field of a GUI. The system identifies multiple different meanings associated with the terms, including two query-type operations (i.e., search for an invoice corresponding to an entity "May Lowe" and search for an invoice for a month of May for an entity "Lowe"). In other words, the system determines the term "May" has multiple different meanings, a proper name or a month. The system identifies two operations of the same type (e.g., queries with different query terms) that may be performed based on the two different meanings. The system identifies the user that entered the terms in the text entry field. The system accesses profile data associated with the user. The system identifies, based on the profile data, the subset of operations corresponding to the multiple interpretations of the terms. If the system determines that the user is associated with a set of clients that includes a client "May Lowe," the system may filter the possible interpretations for the term "invoice" to a set of operations, including searching for an invoice corresponding to the entity May Lowe. Based on the profile data, the system selects an interpretation for the term "invoice" that filters out from the subset of operations an operation to search for an invoice in the month of May for a client Lowe.

According to one example, the user profile data includes data specifying data and objects to which the user is permitted access. For example, if three operations exist that match the terms "May Lowe invoice," and if the system determines that the user has access to only two of the operations, the system filters out the third operation to which the user lacks access. The system may select the operation to present to the user from among the remaining two operations. According to another example, the user profile data includes historical query data for the user. The system may identify two candidate operations that may be presented to the user based on the terms "May Lowe invoice." The system may determine that from among the candidate operations, the user has historically performed an operation to view a set of invoices for a client "May Lowe." For example, the system may determine that the operation to view the invoices was performed more recently than an operation to generate an invoice. Alternatively, the system may determine that the operation to view the invoices was performed more frequently than the operation to generate an invoice. Based on the historical query data, the system may select one particular operation from among the two candidate operations to perform.

According to another embodiment, the system analyzes user profile data of other users, other than the user that entered the terms in the term entry field, to select the subset of operations. The system may select the additional users based on relationships between the additional users and the user that entered the terms in the text entry field. For example, the system may identify a position of the user within an organization. The system may identify operations performed by other users with the same or similar positions within the organization. Additionally, or alternatively, the system may identify operations performed by other users associated with the user's position such as subordinates in the organization hierarchy. The system may identify in the user profiles of the additional users one or more context terms. The system may generate, based on the context terms, confidence values for each of the different operations among the subset of operations. Additionally, or alternatively, the system may identify in operation logs or histories for the additional users one or more operations that may be stored as context terms. For example, the user profile may specify a user's position within an organization. Based on the user's position within the organization, the system identifies three other users with similar positions within the organization. The system analyzes operation logs associated with the three other users. Based on the operation logs, the system selects a subset of operations that correspond to the terms entered by the user. As described above, the system may generate confidence values associated with the operations in the subset of operations.

According to yet another embodiment, the system analyzes a set of displayed data to select the subset of operations. The system may determine what content is being displayed by interfacing with a GUI API to determine displayed content. For example, the system may interact with the GUI API to identify a root component of a JFrame and child components of the JFrame. Obtaining information about child components may include iteratively executing operations to identify "AccessibleContext." Additionally, or alternatively, the system may perform a pixel analysis to identify text, patterns, and shapes displayed on a display device. Additionally, or alternatively, the system may access an API of an application that is currently executing to determine content that is presently being displayed. For example, based on a system request, a personnel management application may transmit to the system context data that includes a set of names of personnel being displayed and a name of a data object in a database where records corresponding to the set of names is stored.

According to one embodiment, a system accesses system data to identify an application that is displaying data concurrently while a user enters terms into a text entry field. For example, when the user presses a selection icon in a GUI indicating selection of a set of terms, the system retrieves the system data to identify the application that was displaying data when the user selected the selection icon. The system then interacts with an API for the application to identify the content that was displayed at the time the user selected the term selection icon.

Additionally, or alternatively, to identifying the application displaying data, the system may identify a set of data being displayed. For example, the system may identify a data object or table associated with a set of displayed data. If a user enters the terms "compensation information," and if the system determines that the present display includes a set of employees corresponding to an "Employee" type data object, the system may select as an operation corresponding to the terms retrieving a value from a "salary" field in employee records of the "Employee" object. On the other hand, if the system determines that the present display includes a set of job postings corresponding to records in a "Job Search" data object, the system may select as an operation corresponding to the terms: retrieving a value from a "salary" field of job posting records in the "Job Search" data object.

As another example, if a user enters the terms "May Lowe Invoice," and if the system determines the presently displayed data includes one or more invoices, the system may select as an operation corresponding to the terms generating a query to search an "Invoice" data object for an invoice including the terms "May" and "Lowe." If the system determines that the presently displayed data includes product inventory data, the system may select as an operation: generating a new invoice and populate the invoice with the terms "May Lowe."

As a particular example embodiment, a user enters the terms "May Lowe invoice" into a term entry field of a GUI. The system identifies the following possible meanings for the terms "May Lowe Invoice": search an invoice repository to identify an invoice associated with May Lowe; search an invoice repository to identify an invoice associated with an entity "Lowe" in the month of May; generate a new invoice to an entity "May Lowe;" and generate a new invoice to an entity "Lowe" dated in May. The system analyzes the displayed data that is displayed concurrently with the user entering the terms in the term entry field. The system determines that the displayed data is associated with a client "May Lowe." The system further determines that the displayed data includes past invoices for the client "May Lowe." The system identifies the following operations as a subset of operations associated with the search terms "May Lowe invoice": generate a new invoice for the client "May Lowe" (confidence level 90%) and retrieve an existing invoice for the client "May Lowe" (confidence level 10%).

The system initiates the selected operation corresponding to the target interpretation for the set of user-entered terms (Operation 212). Initiating an operation may include formulating a command based on the user-entered text to direct an application to perform the operation. Example operations include the following: generating, displaying, retrieving and modifying text and image content; generating, displaying, retrieving, and modifying data objects stored in a database; and initiating operations such as data analysis, system monitoring, presenting visualizations of stored data; and converting data from one type to another (such as from alphanumeric values to graphs, charts, and shapes representing the data). For example, the system may determine that a particular term meaning, among a set of three possible meanings for a set of terms, corresponds to a highest confidence value. The system initiates an operation that corresponds to the highest-ranked term meaning. According to another example, the system determines that a particular operation, from among a set of three candidate operations, corresponds to a highest confidence value. According to an alternative embodiment, the system may present in the GUI one or more recommendations for executing operations. For example, the system may present a window prompting a user to select from among multiple candidate operations corresponding to a set of terms entered by a user. As an example, the system may generate a window with the following prompt including the two operations corresponding to the highest confidence values: "Would you like to generate an invoice for May Lowe?" and "Would you like to search existing invoices for Lowe?"

The system structures a set of instructions for executing a selected operation using the user-entered terms. For example, upon determining the term "May" in the set of terms "May Lowe invoice" corresponds to an entity rather than a month, the system uses the terms "May Lowe" as query terms for an "entity name" attribute in a set of instructions. The system uses the term "invoice" to structure a query to an "Invoice" data object in a database.

4. Training a Machine Learning Model

Figure 3:
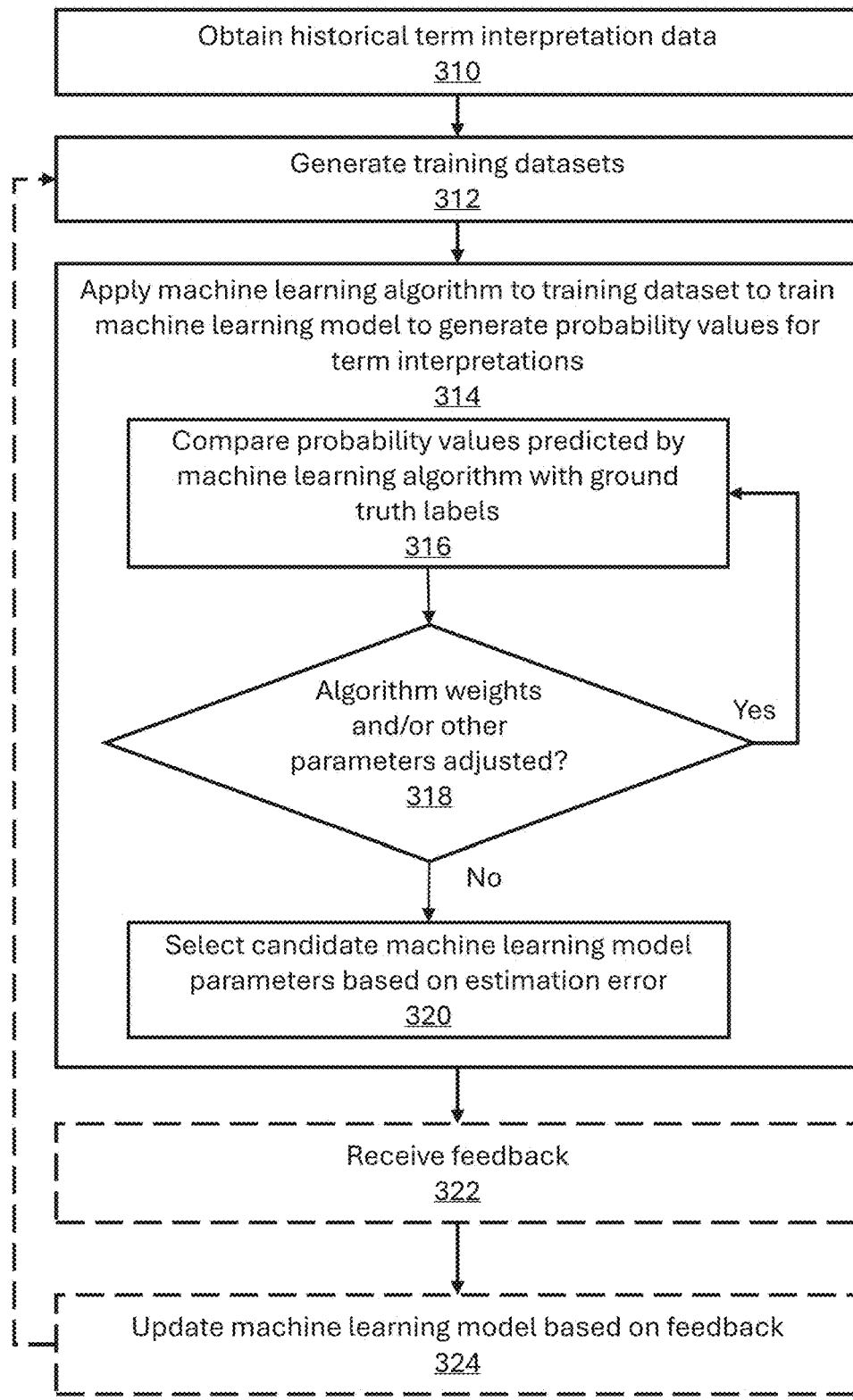
FIG. 3 illustrates an example set of operations for training a machine learning model.

FIG. 3 describes training a machine learning model to predict confidence values for term interpretations in further detail. In one or more embodiments, a system (e.g., one or more components of system 100 illustrated in FIG. 1) obtains historical term interpretation data (Operation 310). Obtaining the historical term interpretation data may include obtaining any of the following: historical records of terms entered by users, developer-generated sets of terms for training the machine learning model, synthetically-generated sets of terms (e.g., sets of terms generated from a computer patterned after historical user-generated terms), application data associated with the sets of terms, user profile data, and display data. The application data includes, for example, applications running when the terms were received, applications opened based on the terms, and functions of the applications executed based on the terms. Examples of user profile data and display data were described previously in connection with the system 100 of FIG. 1.

The system uses the historical term interpretation data to generate a set of training data (Operation 312). The set of training data includes, for a particular set of one or more terms, at least one candidate interpretation for the term or set of terms. In one embodiment, a training data set record includes (a) a set of one or more terms, (b) two or more interpretations for the set of terms, and (c) confidence values for the two or more interpretations.

According to one embodiment, the system obtains the historical term interpretation data and the training data set from a data repository storing labeled data sets. The training data set may be generated and updated by an application management platform or enterprise. Alternatively, the training data set may be generated and maintained by a third party. According to one embodiment, the system generates the labeled set of data by parsing documents and generating labels based on parsed values in the documents. According to an alternative embodiment, one or more users generate labels for a data set.

In some embodiments, generating the training data set includes generating a set of feature vectors for the labeled examples. A feature vector, for example, may be n-dimensional, where n represents the number of features in the vector. The number of features that are selected may vary depending on the implementation. The features may be curated in a supervised approach or automatically selected from extracted attributes during model training and/or tuning. Example features include terms, term interpretations, confidence values, user data of a user entering terms in a text entry field, user data of other users, display data of a data set being displayed concurrently with receipt of the text in the text entry field, display data of a data set displayed subsequent to receiving the text in the text entry field, and operation data of operations executed based on the text entered in the text entry field. In some embodiments, a feature within a feature vector is represented numerically by one or more bits. The system may convert categorical attributes to numerical representations using an encoding scheme, such as one-hot encoding, label encoding, and binary encoding. One-hot encoding creates a unique binary feature for each category in an original feature. In one-hot encoding, when one feature has a value of 1, the remaining features have a value of 0. For example, if a particular application may perform ten different types of operations, the system may generate ten different features of an input data set. When one category is present (e.g., value "1"), the remaining features are assigned a value "0." According to another example, the system may perform label encoding by assigning a unique numerical value to each category. According to yet another example, the system performs binary encoding by converting numerical values to binary digits and creating a new feature for each digit.

The system applies a machine learning algorithm to the training data set to train the machine learning model (Operation 314). For example, the machine learning algorithm may analyze the training data set to train neurons of a neural network with weights and offsets to associate a particular interpretation for a particular term with a particular confidence value.

In some embodiments, the system iteratively applies the machine learning algorithm to a set of input data to generate an output set of labels, compares the generate labels to pre-generated labels associated with the input data, adjusts weights and offsets of the algorithm based on an error, and applies the algorithm to another set of input data.

In some embodiments, the system compares the confidence values estimated through the one or more iterations of the machine learning model algorithm with ground truth labels to determine an estimation error (Operation 316). The system may perform this comparison for a test set of examples that may be a subset of examples in the training dataset that were not used to generate and fit the candidate models. The total estimation error for a particular iteration of the machine learning algorithm may be computed as a function of the magnitude of the difference and/or the number of examples for which the estimated label was wrongly predicted.

In some embodiments, the system determines whether or not to adjust the weights and/or other model parameters based on the estimation error (Operation 318). Adjustments may be made until a candidate model that minimizes the estimation error or otherwise achieves a threshold level of estimation error is identified. The process may return to Operation 318 to adjust and continue training the machine learning model.

In some embodiments, the system selects machine learning model parameters based on the estimation error meeting a threshold accuracy level (Operation 320). For example, the system may select a set of parameter values for a machine learning model based on determining that the trained model has an accuracy level for predicting confidence values of at least 98%.

In some embodiments, the system trains a neural network using backpropagation. Backpropagation is a process of updating cell states in the neural network based on gradients determined as a function of the estimation error. With backpropagation, nodes are assigned a fraction of the estimated error based on the contribution to the output and adjusted based on the fraction. In recurrent neural networks, time is also factored into the backpropagation process. For example, a set of term interpretation data may be processed as a separate discrete instance of time. For instance, an example may include term interpretation data $c_1$, $c_2$, and $c_3$ that correspond to times t, t+1, and t+2, respectively. Backpropagation through time may perform adjustments through gradient descent starting at time t+2 and moving backward in time to t+1 and then to t. Furthermore, the backpropagation process may adjust the memory parameters of a cell such that a cell remembers contributions from previous expenses in the sequence of expenses. For example, a cell computing a contribution for $e_3$ may have a memory of the contribution of $e_2$, which has a memory of $e_1$. The memory may serve as a feedback connection such that the output of a cell at one time (e.g., t) is used as an input to the next time in the sequence (e.g., t+1). The gradient descent techniques may account for these feedback connections such that the contribution of one term, among a set of terms entered by a user in a text entry field of a GUI, to a cell's output may affect the contribution of the next term, among the set of terms, in the cell's output. Thus, the contribution of $c_1$ may affect the contribution of $c_2$, etc.

In embodiments in which the machine learning algorithm is a supervised machine learning algorithm, the system may optionally receive feedback on the various aspects of the analysis described above (Operation 322). For example, the feedback may affirm or revise labels generated by the machine learning model. The machine learning model may indicate that a particular interpretation for a particular term has a confidence value of 0.9. The system may receive feedback indicating that the particular interpretation should instead be associated with a 0.6 confidence value. Based on the feedback, the machine learning training set may be updated (Operation 324), thereby improving its analytical accuracy. Once updated, the system may further train the machine learning model by optionally applying the model to additional training data sets.

5. Example Embodiments

A detailed example is described below for purposes of clarity. Components and/or operations described below should be understood as one specific example that may not be applicable to certain embodiments. Accordingly, components and/or operations described below should not be construed as limiting the scope of any of the claims.

Figure 4A:
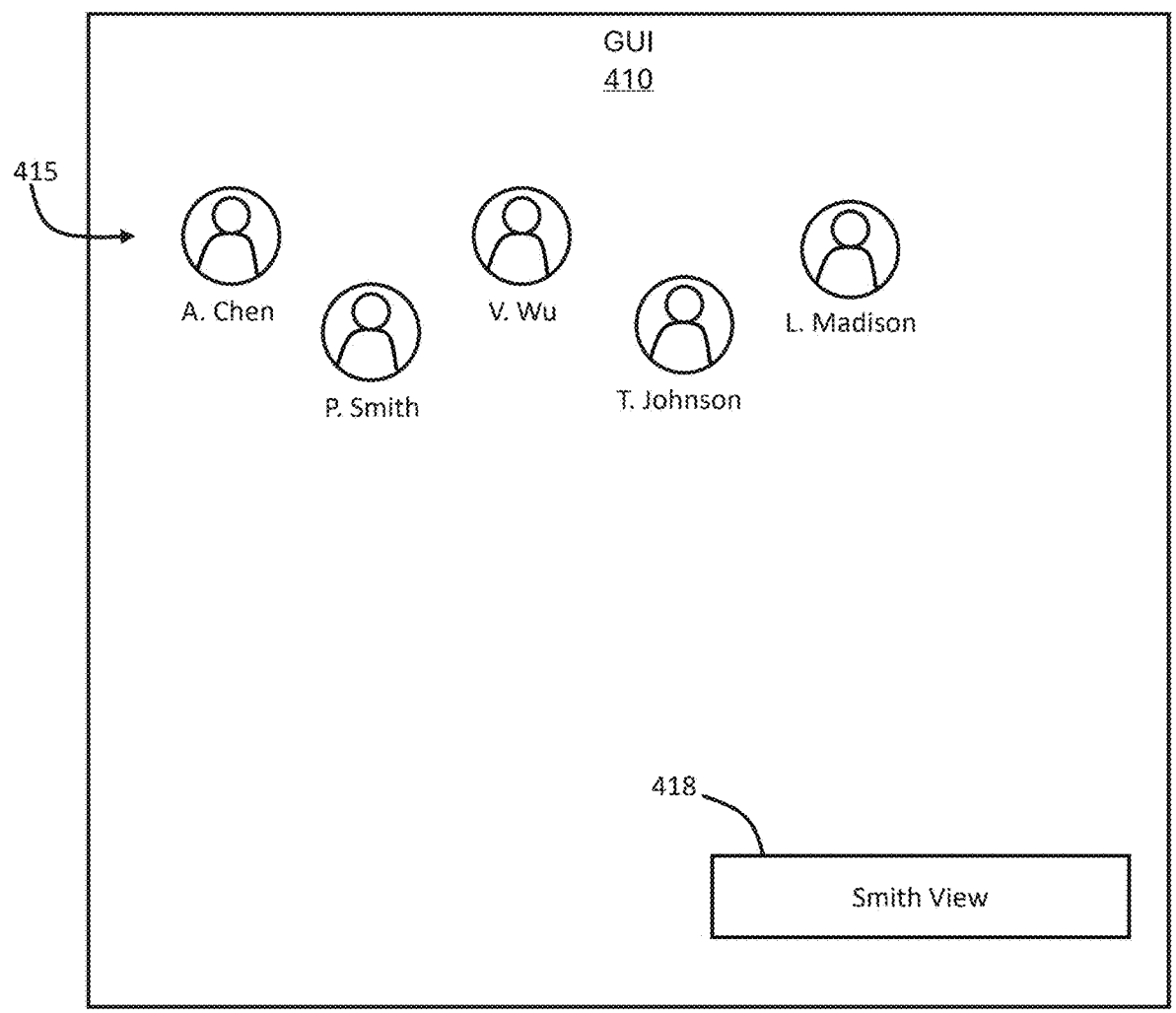
FIGS. 4A-4D illustrate example embodiments of context-based operation selection.

Referring to FIG. 4A, a system presents a graphical user interface (GUI) 410 to facilitate user interaction with data stored and managed by the system. In FIG. 4A, the GUI 410 displays visual interface elements 415 representing records in an employee database. For example, a user may request to view employees on a particular sales team. The GUI presents visual interface elements 415 representing five employees. The GUI 410 includes a text entry field 418. The text entry field 418 receives text input from a user. The text input from the user causes the system to perform operations. For example, while the system displays employee data, entering text in the text entry field 418 may cause the system to modify values for the data being displayed, perform an operation with the data being displayed, or modify how the data is being displayed. Alternatively, entering the text in the text entry field may change what data is displayed (e.g., displayed a different set of employees) or open a new application altogether.

In the example illustrated in FIG. 4A, a user enters the text "Smith View" into the text entry field 418. The text is entered as natural language or as human-readable words without programming language elements or logical operands. The system determines that both terms "Smith" and "View" correspond to multiple interpretations. The system determines that there are seven records associated with the name "Smith" in the system. The system further determines that the word "View" corresponds to two different operations. One operation would result in viewing a record. Another operation corresponds to how the system filters and presents data from data objects as "views."

The system obtains context data to determine the interpretation of the terms "Smith View." The system provides the term "Smith" and the employee IDs for the seven different employees as input data to a trained machine learning model. The system further provides context data, including display data as input data to the trained machine learning model. The system obtains the display data by querying a data management application that is being executed to present the visual interface elements 415 representing the five employees. The system retrieves from the data management application employees display data including the employees that are being displayed concurrently with receiving the text "Smith View" in the text entry field 418. The display data associated with the employees being displayed is context data associated with the ambiguous term "Smith." The system further retrieves from the data management application information about the functions associated with the displayed data. In the example of FIG. 4A, the functions associated with the display of the five employees includes displaying selected groups of employees, selection of particular employees, displaying data for the particular employees, modifying groups of employees, and modifying data for particular selected employees. Modifying groups of employees includes creating a new group from existing employees, adding a new employee to a group and to a database of employees, and modifying values associated with the group of employees and/or with particular selected employees.

The system converts the input data for the machine learning model into a numerical input vector. The numerical input vector includes values for the input features, including terms, term interpretations, and context data. Based on the input data, the machine learning model predicts the following confidence values: P. Smith: 0.9; A. Smith: 0.05; R. Smith: 0.03; J. Smith: 0.02. The system selects the record for P. Smith based on the confidence value exceeding a threshold. In addition, based on the input data, the machine learning model predicts the following confidence values: view function 1: 0.8; view function 2: 0.2. The system selects "view function 1," corresponding to presenting a view of a user's profile, as a target operation based on the confidence value exceeding a threshold.

Figure 4B:
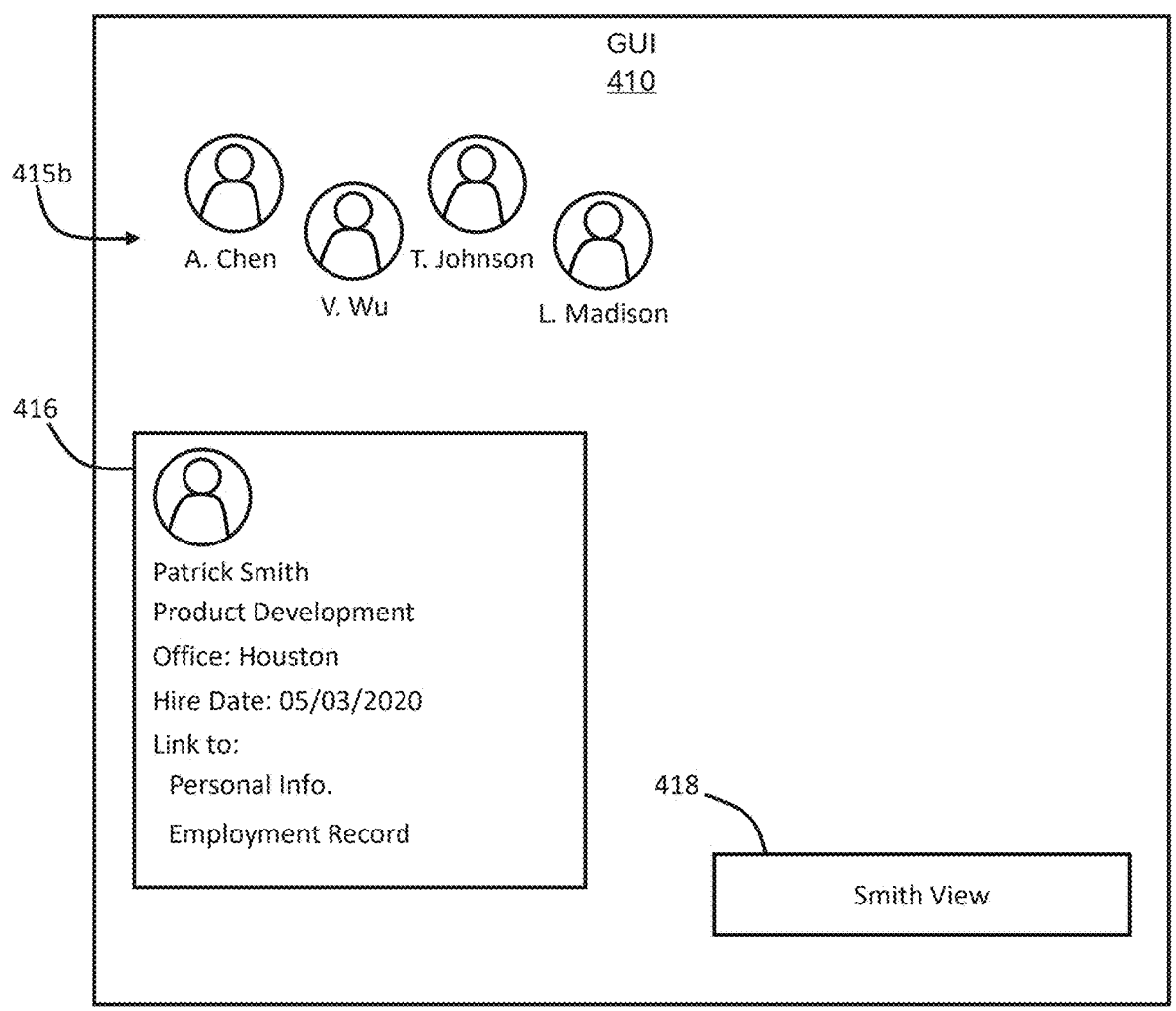

As illustrated in FIG. 4B, the system modifies the data visualized in the GUI 410 to present user profile data 416 for the employee "Patrick Smith." In other words, the system predicted the interpretation of the term "Smith" in the text entry field 418 as corresponding to "P. Smith" being displayed in FIG. 4A based on the retrieved display data. The system predicted the interpretation of the term "View" in the text entry field 418 to be "present a detailed view of profile data for P. Smith" based on the retrieved display data.

While FIGS. 4A and 4B represent an example of applying terms, term interpretations, and context data to a machine learning model to predict confidence values for interpretations, in some embodiments, the system determines whether or not to apply the machine learning model based on the context data. For example, the system may obtain a set of display data associated with a set of terms entered in the text entry field 418. The system may determine if a single direct match exists between a particular interpretation and the display data. For example, in FIG. 4A, the system determines that, among the seven employees including a name "Smith," only one "Smith" is displayed concurrently with entering the term "Smith" in the text entry field. Accordingly, the system applies a rule to select "P. Smith" as the interpretation for the term "Smith" based on determining a single interpretation (e.g., "P. Smith") matches the display data (e.g., only a single "Smith" is displayed concurrently with receiving the text input in the text entry field 418) without applying the machine learning model. The system may still apply the machine learning model to predict the interpretation for the term "View." Applying defined rules to determine if and when to apply the machine learning model to terms and candidate interpretations may conserve processing capacity in an enterprise in which many users may be accessing data concurrently.

Figure 4C:
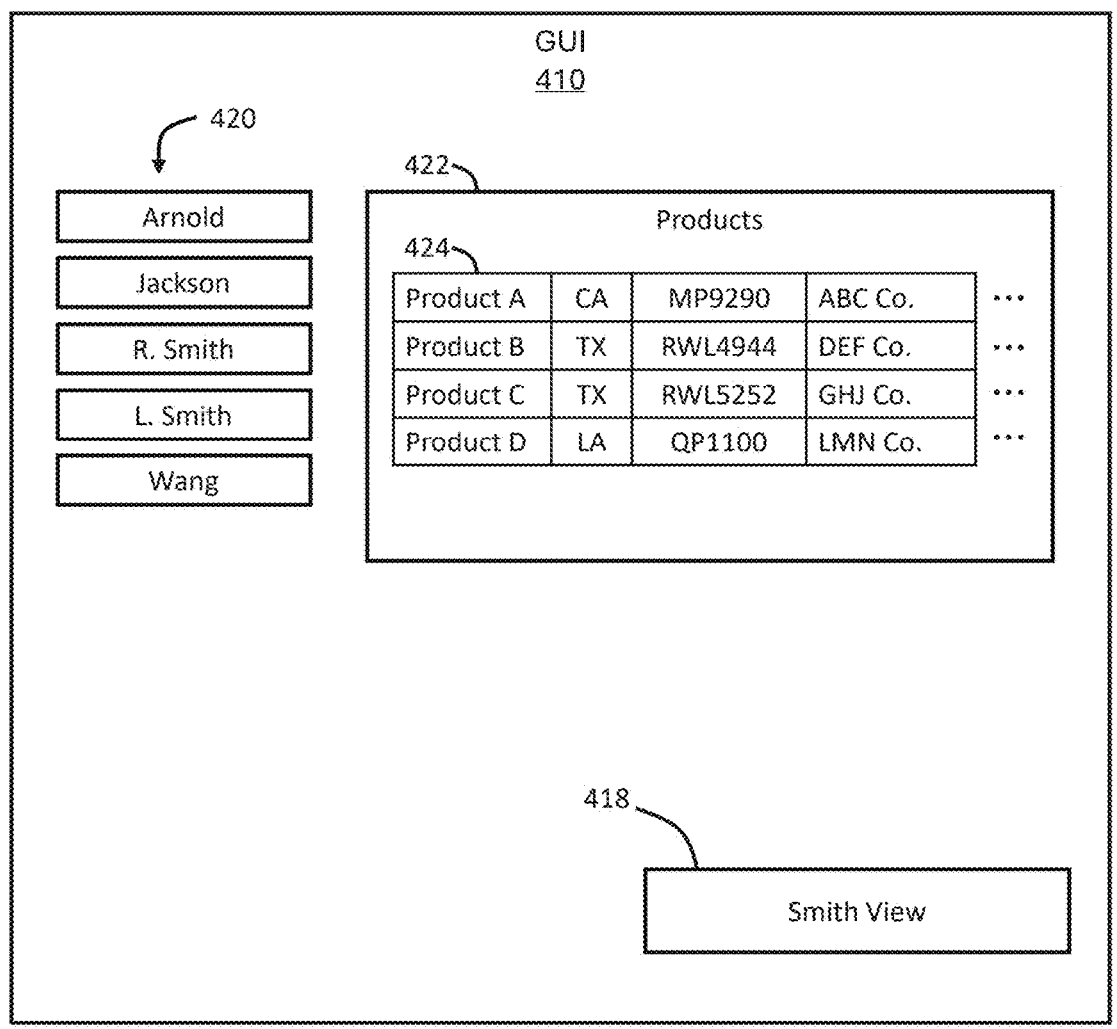
Figure 4D:
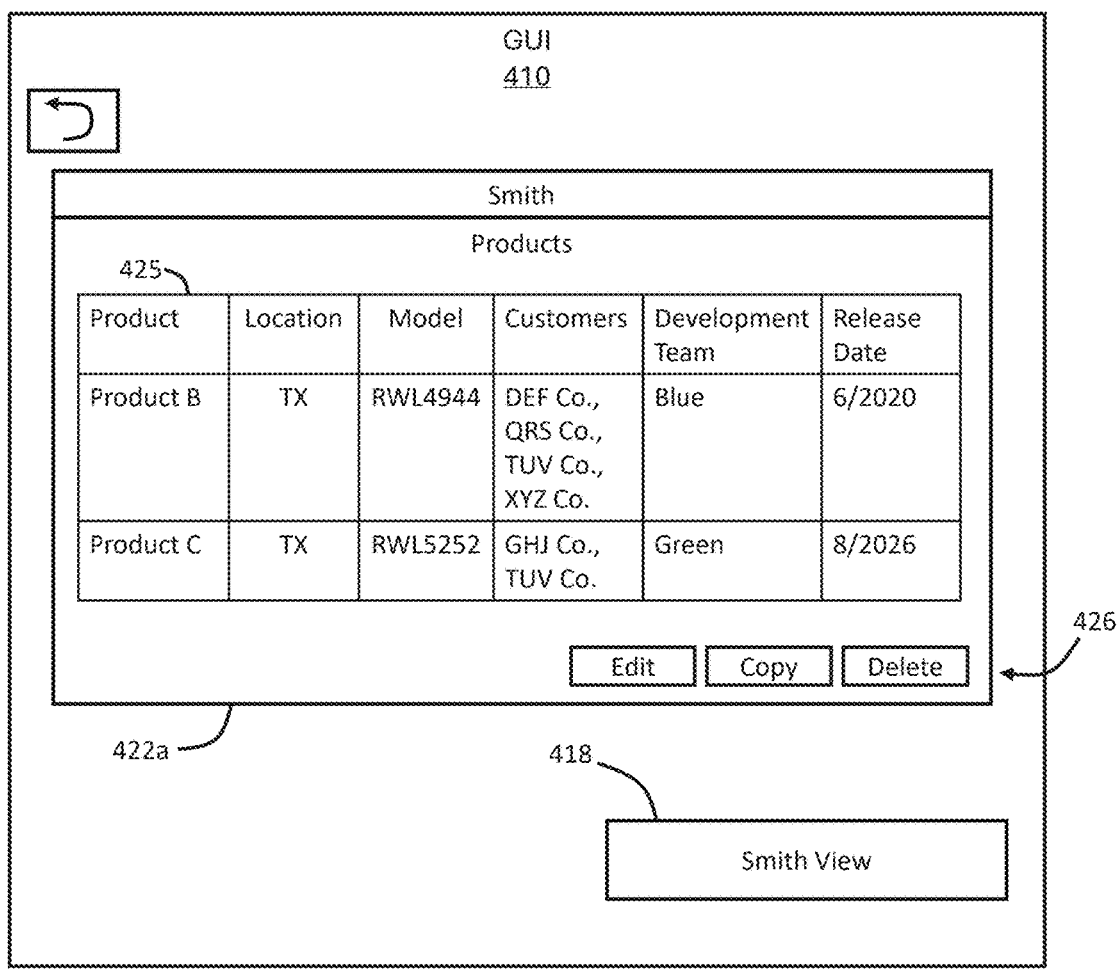

FIGS. 4C and 4D illustrate a system predicting a different interpretation for the terms "Smith View" in a text entry field based on different context data. As illustrated in FIG. 4C, the GUI 410 displays a set of employees 420 representing different product developers within a company. The GUI 410 further displays a "Products" data object 422 including a table 424. The table includes values for attributes of the "Products" data object 422. In contrast to FIG. 4A, which was a user interface to view and modify employee data, FIG. 4C corresponds to a user interface to change a view available to a user. In other words, FIG. 4C corresponds to a set of functions to view and modify which attributes and values of the data object "Products" 422 are available to the set of employees 420.

While displaying the set of employees 420 and the "Products" data object 422, a user enters the terms "Smith View" into the text entry field 418. The system again determines that the term "Smith" corresponds to multiple interpretations associated with seven employees with the name "Smith." The system further determines the term "View" is associated with two different types of functions capable of being performed by the data management application. One operation would result in viewing a record. Another operation corresponds to how the system filters and presents data from data objects as "views."

The system obtains profile data of the user entering the terms "Smith View" into the text entry field 418. The profile data includes data about the user's role in an enterprise. The system applies the term "Smith," the multiple interpretations, and context data, including display data and the user profile data, to a machine learning model. The machine learning model predicts the interpretation R. Smith is associated with a confidence value of 0.75 and the interpretation L. Smith is associated with a confidence value of 0.2. For example, the machine learning model may have "learned" during training that the user's role (e.g., a department manager over R. Smith) has a strong correlation with the interpretation "R. Smith," resulting in the machine learning model learning to generate a high confidence value for the interpretation "R. Smith" based on the provided set of input data, including the user profile data of the user entering the terms in the text entry field 418.

The system further applies display data and profile data to the machine learning model to predict the target interpretation for the term "View." The profile data may include user profile data of other users having a same role as the user entering the terms in the text entry field. Based on the input data—including the terms, the term interpretations, and the context data—the machine learning model predicts the target interpretation for the term "View" includes a particular set of attributes from the data object "Products." Referring to FIG. 4D, based on the predicted interpretations generated by the machine learning model, the system causes the GUI to include a particular view 422a of the "Products" data object. The view 422a includes a table 425. The table includes a defined set of attributes (e.g., "Product," "Location," "Model," etc.). The table 425 further includes a defined set of products (i.e., "Product B" and "Product C"). The view 422a represents a subset of attributes and values included in the "Products" data object 422 the user "R. Smith" is configured to access. The GUI 410 may further display interface elements 426 to edit, copy, delete, and otherwise modify the view 422a associated with the employee "R. Smith."

Based on the above example embodiments, the system uses context data to resolve ambiguities in user-entered text. The ambiguities may result in multiple possible interpretations of the user-entered text. The context data includes display data corresponding to content and data sets being displayed in the user interface. The context data further includes user profile data of a user entering text in the text entry field and user profile data of other users having particular relationships with the user entering text in the text entry field. The system determines whether or not to apply a machine learning model to a set of input data, including terms entered in the text entry field, interpretations for the terms, and the context data. Based on one or both of (a) applying a rule to select a target interpretation for an ambiguous term or (b) applying the machine learning model to generate a confidence value for an ambiguous term, the system predicts a target interpretation for the set of terms entered in the text entry field 418. The system selects and initiates an operation based on the target interpretation.

Applying the context data, including user profile data and extracted display data, to predict the target interpretation for user-entered terms increases an accuracy of the interpretation. As a result, the system is more likely to perform an operation intended by the user. The system is less subject to errors, such as performing operations that were not intended by a user. Consequently, the system both conserves processing resources, improves data security, and provides a user with an improved user interface. Users can request operations in natural language, reducing the need to browse through decision trees or memorize particular paths to arrive at functions or documents. Users are further able to reduce the time required to initiate operations.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
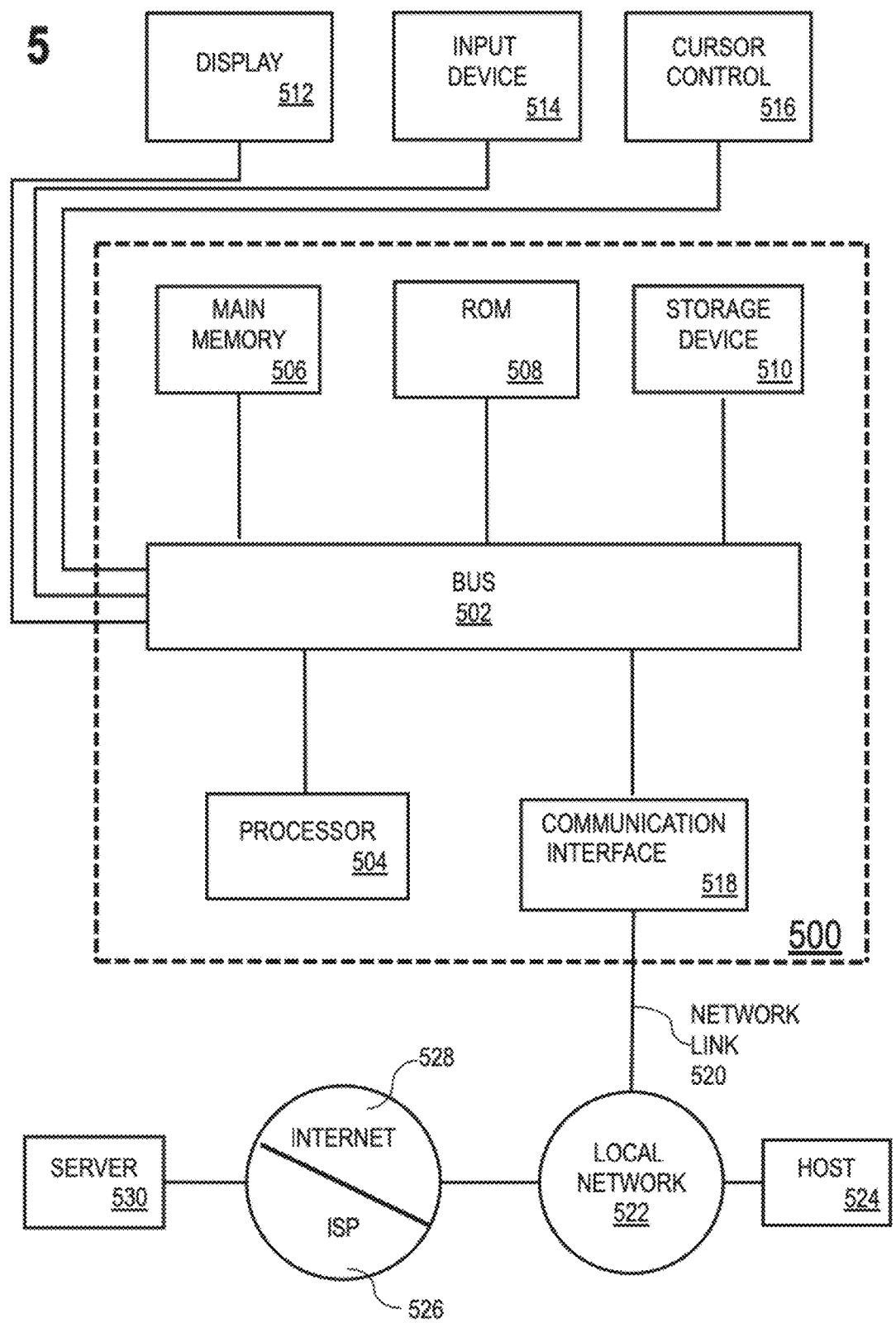
FIG. 5 shows a block diagram that illustrates a computer system in accordance with one or more embodiments.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or a Solid-State Drive (SSD) is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
  displaying in a graphical user interface (GUI) of an application platform, a visualization of a particular data set;
  concurrently with displaying the visualization: receiving from a user interacting with the GUI, natural language user input comprising a set of terms, the set of terms comprising one or more terms;
  identifying, by a term interpretation engine executing on the application platform, a plurality of candidate term interpretations for the set of terms;
  based on identifying the plurality of candidate term interpretations, obtaining, by a context data extraction engine executing on the application platform, a set of context data associated with the GUI, wherein the set of context data comprises at least one of:
    user profile information of the user interacting with the GUI,
      wherein the user profile information specifies a role of the user in an organization; and
    display data associated with the visualization of the particular data set,
      wherein the term interpretation engine obtains the set of display data by initiating an application programming interface (API) call to a particular application displaying information in the GUI;
  determining, by the term interpretation engine, a relationship between a particular candidate term interpretation, of the plurality of candidate term interpretations, and the set of context data,
    wherein determining the relationship between the particular candidate term interpretation and the user profile information including the role of the user in the organization includes determining at least one of (a) additional users associated with the user based on the role of the user, and (b) a set of operations associated with the role of the user;
  responsive to determining the relationship, selecting, by the term interpretation engine, the particular candidate term interpretation as a target term interpretation; and
  selecting and executing a first command based on the target term interpretation.

2. The one or more non-transitory computer readable media of claim 1, wherein the operations further comprise:
  determining that a first term interpretation among the plurality of candidate term interpretations corresponds to the first command; and
  determining that a second term interpretation among the plurality of candidate term interpretations corresponds to a second command that is different from the first command,
  wherein the context data extraction engine executing on the application platform obtains the set of context data based on determining, by the term interpretation engine: the first term interpretation corresponds to the first command, the second term interpretation corresponds to the second command, and the first command is different from the second command.

3. The one or more non-transitory computer readable media of claim 2, wherein determining the relationship between the particular candidate term interpretation and the set of context data comprises:
  determining a first confidence score corresponding to a first relationship between a first term interpretation and the context data; and
  determining a second confidence score corresponding to a second relationship between a second term interpretation and the context data,
  wherein the first confidence score and the second confidence score are based on at least:
    historical execution of commands;
    historical user data of users initiating the commands; and
    semantic data associated with an operation corresponding to the command and the first and second term interpretations, and
  wherein selecting and executing the first command is based on determining the first confidence score is higher than the second confidence score.

4. The one or more non-transitory computer readable media of claim 1, wherein the operations further comprise:
  applying the set of terms to a trained machine learning model to predict confidence values for the plurality of candidate term interpretations,
  wherein selecting the particular candidate term interpretation is based on least on determining a first confidence value corresponding to the target term interpretation is greater than a second confidence value corresponding to a second term interpretation, from among the plurality of candidate term interpretations.

5. The one or more non-transitory computer readable media of claim 4, wherein the operations further comprise:
  generating a training dataset comprising a set of command execution records, wherein each record of the set of command execution records comprises:
    a first set of terms; and
    at least one candidate interpretation associated with at least one term among the first set of terms,
  wherein each record further comprises at least one of:
    first user profile data of a first user that entered the first set of terms; and
    first display data of a first data set displayed concurrently with receiving the first set of terms;
  generating the trained machine learning model at least by:
    (a) applying record data to a candidate model, (b) generating, by the candidate model, a set of output data, (c) generating an error value based on a comparison of the output data to a ground-truth label in the record data, and (d) modifying parameters of the candidate model; and
  iteratively performing (a)-(d) until a threshold model performance metric is met.

6. The one or more non-transitory computer readable media of claim 1, wherein the context data includes the display data, and
  wherein the display data includes at least one of:
    a type of data that is visualized in the visualization of the particular data set;

a name of the data that is visualized in the visualization of the particular data set; and an identity of one or more data objects storing the data that is visualized in the visualization of the particular data set.

7. The one or more non-transitory computer readable media of claim 1, wherein the context data includes the user profile information, and wherein selecting the particular candidate term interpretation comprises:

determining a relationship between the particular candidate term interpretation, of the plurality of candidate term interpretations, and a user profile associated with at least one of (a) the user and (b) a set of one or more users that meet one or more similarity criteria in relation to the user, wherein the particular candidate term interpretation is selected responsive to determining the relationship between the particular candidate term interpretation and the user profile.

8. The one or more non-transitory computer readable media of claim 1, wherein selecting the particular candidate term interpretation as a target term interpretation comprises:

selecting the particular candidate term interpretation as the target term interpretation based on determining the particular candidate term interpretation meets a relationship criteria associated with the set of context data; and refraining from using an alternative candidate term interpretation based on determining the alternative candidate term interpretation does not meet the relationship criteria associated with the set of context data.

9. A method comprising:

displaying in a graphical user interface (GUI) of an application platform, a visualization of a particular data set;

concurrently with displaying the visualization: receiving from a user interacting with the GUI, natural language user input comprising a set of terms, the set of terms comprising one or more terms;

identifying, by a term interpretation engine executing on the application platform, a plurality of candidate term interpretations for the set of terms;

based on identifying the plurality of candidate term interpretations, obtaining, by a context data extraction engine executing on the application platform, a set of context data associated with the GUI, wherein the set of context data comprises at least one of:

user profile information of the user interacting with the GUI, wherein the user profile information specifies a role of the user in an organization; and display data associated with the visualization of the particular data set, wherein the term interpretation engine obtains the set of display data by initiating an application programming interface (API) call to a particular application displaying information in the GUI;

determining, by the term interpretation engine, a relationship between a particular candidate term interpretation, of the plurality of candidate term interpretations, and the set of context data, wherein determining the relationship between the particular candidate term interpretation and the user profile information including the role of the user in the organization includes determining at least one of (a) additional users associated with the user based on the role of the user, and (b) a set of operations associated with the role of the user;

responsive to determining the relationship, selecting, by the term interpretation engine, the particular candidate term interpretation as a target term interpretation; and selecting and executing a first command based on the target term interpretation.

10. The method of claim 9, further comprising:

determining that a first term interpretation among the plurality of candidate term interpretations corresponds to the first command; and determining that a second term interpretation among the plurality of candidate term interpretations corresponds to a second command that is different from the first command, wherein the context data extraction engine executing on the application platform obtains the set of context data based on determining, by the term interpretation engine: the first term interpretation corresponds to the first command, the second term interpretation corresponds to the second command, and the first command is different from the second command.

11. The method of claim 10, wherein determining the relationship between the particular candidate term interpretation and the set of context data comprises:

determining a first confidence score corresponding to a first relationship between a first term interpretation and the context data; and determining a second confidence score corresponding to a second relationship between a second term interpretation and the context data, wherein the first confidence score and the second confidence score are based on at least:

historical execution of commands;

historical user data of users initiating the commands; and semantic data associated with an operation corresponding to the command and the first and second term interpretations, and wherein selecting and executing the first command is based on determining the first confidence score is higher than the second confidence score.

12. The method of claim 9, further comprising:

applying the set of terms to a trained machine learning model to predict confidence values for the plurality of candidate term interpretations, wherein selecting the particular candidate term interpretation is based on least on determining a first confidence value corresponding to the target term interpretation is greater than a second confidence value corresponding to a second term interpretation, from among the plurality of candidate term interpretations.

13. The method of claim 12, further comprising:

generating a training dataset comprising a set of command execution records, wherein each record of the set of command execution records comprises:

a first set of terms; and a first command initiated based on the first set of terms, wherein each record further comprises at least one of:

first user profile data of a first user that entered the first set of terms; and first display data of a first data set displayed concurrently with receiving the first set of terms;

generating the trained machine learning model at least by: (a) applying record data to a candidate model, (b) generating, by the candidate model, a set of output data, (c) generating an error value based on a comparison of the output data to a ground-truth label in the record data, and (d) modifying parameters of the candidate model; and
iteratively performing (a)-(d) until a threshold model performance metric is met.

14. The method of claim 9, wherein the context data includes the display data, and wherein the display data includes at least one of:
a type of data that is visualized in the visualization of the particular data set;
a name of the data that is visualized in the visualization of the particular data set; and
an identity of one or more data objects storing the data that is visualized in the visualization of the particular data set.

15. The method of claim 9, wherein the context data includes the user profile information, and
wherein selecting the particular candidate term interpretation comprises:
determining a relationship between the particular candidate term interpretation, of the plurality of candidate term interpretations, and a user profile associated with at least one of (a) the user and (b) a set of one or more users that meet one or more similarity criteria in relation to the user,
wherein the particular candidate term interpretation is selected responsive to determining the relationship between the particular candidate term interpretation and the user profile.

16. A system comprising:
one or more processors; and
memory storing instructions that, when executed by the one or more processors, cause the system to perform operations comprising:
displaying in a graphical user interface (GUI) of an application platform, a visualization of a particular data set;
concurrently with displaying the visualization: receiving from a user interacting with the GUI, natural language user input comprising a set of terms, the set of terms comprising one or more terms;
identifying, by a term interpretation engine executing on the application platform, a plurality of candidate term interpretations for the set of terms;
based on identifying the plurality of candidate term interpretations, obtaining, by a context data extraction engine executing on the application platform, a set of context data associated with the GUI, wherein the set of context data comprises at least one of:
user profile information of the user interacting with the GUI,
wherein the user profile information specifies a role of the user in an organization; and
display data associated with the visualization of the particular data set,
wherein the term interpretation engine obtains the set of display data by initiating an application programming interface (API) call to a particular application displaying information in the GUI;
determining, by the term interpretation engine, a relationship between a particular candidate term interpretation, of the plurality of candidate term interpretations, and the set of context data,
wherein determining the relationship between the particular candidate term interpretation and the user profile information including the role of the user in the organization includes determining at least one of:
(a) additional users associated with the user based on the role of the user, and (b) a set of operations associated with the role of the user;
responsive to determining the relationship, selecting, by the term interpretation engine, the particular candidate term interpretation as a target term interpretation; and
selecting and executing a first command based on the target term interpretation.

17. The system of claim 16, wherein the operations further comprise:
determining that a first term interpretation among the plurality of candidate term interpretations corresponds to the first command; and
determining that a second term interpretation among the plurality of candidate term interpretations corresponds to a second command that is different from the first command,
wherein the context data extraction engine executing on the application platform obtains the set of context data based on determining, by the term interpretation engine: the first term interpretation corresponds to the first command, the second term interpretation corresponds to the second command, and the first command is different from the second command.

18. The system of claim 17, wherein determining the relationship between the particular candidate term interpretation and the set of context data comprises:
determining a first confidence score corresponding to a first relationship between a first term interpretation and the context data; and
determining a second confidence score corresponding to a second relationship between a second term interpretation and the context data,
wherein the first confidence score and the second confidence score are based on at least:
historical execution of commands;
historical user data of users initiating the commands; and
semantic data associated with an operation corresponding to the command and the first and second term interpretations, and
wherein selecting and executing the first command is based on determining the first confidence score is higher than the second confidence score.

19. The system of claim 16, wherein the operations further comprise:
applying the set of terms to a trained machine learning model to predict confidence values for the plurality of candidate term interpretations,
wherein selecting the particular candidate term interpretation is based on least on determining a first confidence value corresponding to the target term interpretation is greater than a second confidence value corresponding to a second term interpretation, from among the plurality of candidate term interpretations.

20. The system of claim 19, wherein the operations further comprise:
generating a training dataset comprising a set of command execution records, wherein each record of the set of command execution records comprises:
a first set of terms; and
a first command initiated based on the first set of terms,
wherein each record further comprises at least one of:
first user profile data of a first user that entered the first set of terms; and
first display data of a first data set displayed concurrently with receiving the first set of terms;

generating the trained machine learning model at least by:
(a) applying record data to a candidate model, (b) generating, by the candidate model, a set of output data, (c) generating an error value based on a comparison of the output data to a ground-truth label in the record data, and (d) modifying parameters of the candidate model; and iteratively performing (a)-(d) until a threshold model performance metric is met.

* * * * *